Aug. 12, 1941. J. MARTIN Re. 21,874
COUCH BED
Original Filed Jan. 6, 1939 2 Sheets-Sheet 1
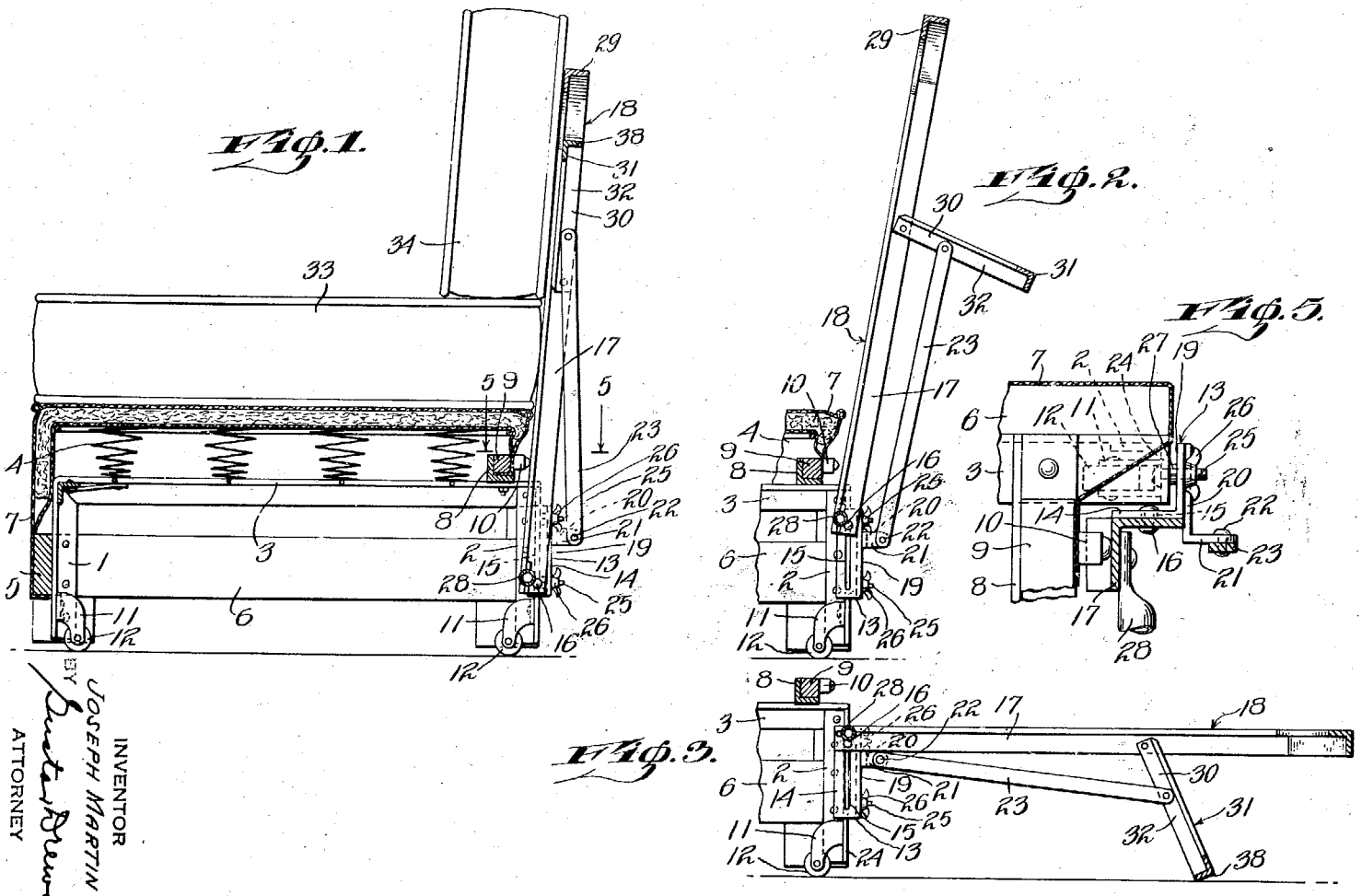
INVENTOR
JOSEPH MARTIN
BY Gustav Drews
ATTORNEY Aug. 12, 1941. J. MARTIN Re. 21,874

COUCH BED

Original Filed Jan. 6, 1939 2 Sheets-Sheet 2

INVENTOR
JOSEPH MARTIN
BY Gustav A. Dreyer
ATTORNEY

Reissued Aug. 12, 1941

Re. 21,874

UNITED STATES PATENT OFFICE 21,874

COUCH BED

Joseph Martin, Laurelton, N. Y., assignor to United States Cabinet Bed Co., Brooklyn, N. Y., a corporation of New York Original No. 2,210,421, dated August 6, 1940, Serial No. 249,573, January 6, 1939. Application for reissue September 12, 1940, Serial No. 356,510

16 Claims. (Cl. 5—38)

This invention relates to couch beds in general and more especially to couch beds having an interchangeable back and bed section such as disclosed in co-pending application for patent Serial No. 244,910, filed December 10, 1938, of Joseph Martin.

Among the objects of the present invention, it is aimed to provide an improved couch bed having a main couch or bed section and an interchangeable back and bed section including a supporting bracket pivotally connected to the interchangeable section, links connecting the supporting bracket to said main bed section and a supporting device operably connecting said interchangeable section with said main bed section for supporting one side of said interchangeable section in horizontal position and in turn for anchoring said interchangeable section in erect position.

It is still another object of the present invention to provide an improved couch bed having a main couch or bed section with vertical or upwardly extending slots adjacent one side of the main bed section, an interchangeable back section having pins at one side slidable in said vertical or upwardly extending slots, a supporting frame pivotally connected to support the other side of said interchangeable section, links connecting said supporting frame to said main section and abutments opposite the upper ends of said vertical or upwardly extending slots on said main section to support said interchangeable section in erect position and some of said abutments serving to support one side of said interchangeable section in horizontal position.

It is still another object of the present invention to provide a frame having vertically or upwardly extending slots and abutments on opposite sides of the upper ends of said slots and a bed section having pivot pins at the ends of a longitudinal side thereof slidably mounted in said slots with a U-shaped supporting bracket pivotally connected to the ends of said bed section, removed from said pivot pins, and links pivotally connecting said bracket to certain of said abutments to enable said bed section to rest in horizontal position on the latter abutments and said bracket and to be anchored in erect position between said opposing abutments with the pivot pins in the lower ends of the slots.

These and other features, capabilities and advantages of the invention will appear from the subjoined detail description of one specific embodiment thereof illustrated in the accompanying drawings in which Figure 1 is an end elevation partly in section of the improved couch bed in couch formation;

Fig. 2 is a fragmental end elevation showing the interchangeable section in raised erect position before being swung into horizontal position;

Fig. 3 is a fragmental end elevation showing the interchangeable back section in horizontal position;

Fig. 5 is a section on the line 5—5 of Fig. 1.

Figure 4:
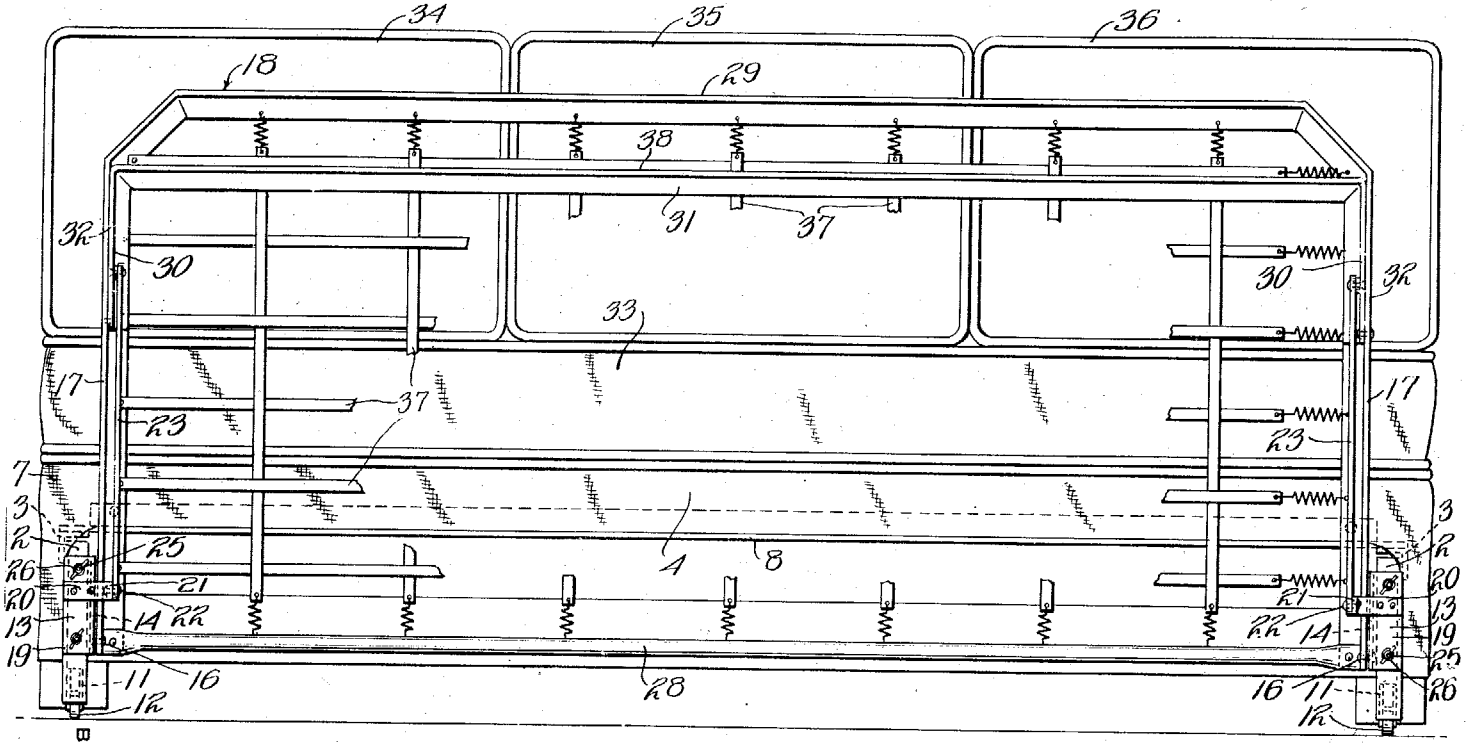
Fig. 4 is a rear elevation of the device in couch formation.

In the embodiment shown, the main bed section consists essentially of an angle iron frame having four standards, two front standards 1, and two rear standards 2 connected at their upper ends to a rectangular frame 3 on which is mounted an inner spring mattress 4. The front standards 1 are connected to the front board 5 and the standards 1 and 2 on each side are connected to the side boards 6. Preferably as shown, the fabric covering 7 for the inner spring mattress 4 extends down to the lower ends of the front and side boards 5 and 6 and is connected thereto to satisfy decorative purposes.

In the present instance, on the rear side of the rectangular frame 3, there is formed an angle iron 8 to which is secured a longitudinally extending bar 9 and to the rear face at the ends of the bar, there are provided two abutment projections 10, one at each end of the bar 9.

The lower ends of the standards 1 and 2 are provided with inwardly extending supporting brackets 11 for the casters 12.

The two rear angle iron standards 2, see particularly Fig. 5, have connected thereto the vertically extending angle irons 13. The angle irons 13 form part of the connecting devices which extend in opposite directions to one another but otherwise are substantially identical and therefore it will suffice to describe but one of them.

The angle iron 13 has an inwardly extending web 14 in which there is formed a vertical slot 15 to receive the connecting pin 16 formed at the end of the side bar 17 of the main rectangular frame 18 of the interchangeable back and bed section. To the outwardly extending web 19 of the angle iron 13, there is also connected the web 20 of the arm 21 pivotally connected by the pin 22 to the link 23. The web 19, as shown in Fig. 5, is preferably removably connected to the inwardly extending web 24 of the standard 2 by the bolts 25 and wing nuts 26. Preferably the webs 24 and 19 are spaced from one another by the spacing nut 27.

The side bars 17 of the frame 18 are connected at one end by the longitudinally extending bar 28 and at their outer ends are connected to the angle iron bar 29.

The downwardly extending webs of the side bars 17 have pivotally connected thereto intermediate their ends, and removed from the pins 16, the extremities of the arms 30 of the bracket or U-shaped angle iron bar 31. The links 23 are in turn connected to the webs 32 of the arms 30.

In couch formation, that shown in Fig. 1, the pivot pins 16 are at the lower ends of the slots 15 with the side bars 17 free to rest against the webs 20 on one side and the abutment pins 10 on the other side when the U-shaped bar will be swung up flat against the frame 18 as shown. In this position, the upholstered member 33 will rest on the inner spring member 4 and the pillows 34, 35 and 36 be positioned on the same and rest against the frame member 18.

The frame member 18 as shown in Fig. 4 is preferably provided with a flat spring fabric 37 to support the upholstered member 33 as a mattress when the frame 18 is extended into the horizontal position shown in Fig. 3.

When moving the frame 18 from its erect position into its horizontal position, it is only necessary to swing the bar 31 outward into the position shown in Fig. 2 to raise the pivot pins 16 to the upper ends of the slots 15 and then permit the frame 18 to swing downward when one end of it adjacent its pin 16 will rest on the arms 21 and the remainder be supported by the bar 31, the connecting portion 38 of this bar resting on the floor as shown in Fig. 3.

It is of course also obvious that the frame 18 may be used without the main bed section when the angle iron 13 and its associated parts may be connected to a wall or the like and constitute a bracket.

It is obvious that various changes and modifications may be made to the details of construction without departing from the general spirit of the invention as set forth in the appended claims.

I claim:

1. The combination of a bed section, a frame having vertically extending slots, abutments on opposite sides of the upper ends of said slots, the abutments on one side of said slots being at a lower level than the abutments on the opposite side and forming a support for the adjacent end of said bed section in horizontal position, pivot pins on one end of said bed section slidably mounted in said slots with the bed section extending upwardly between said opposing abutments in erect position and maintained in erect position by said opposing abutments when the pins are near the lower ends of said slots, a supporting bracket pivotally connected at its extremities to other portions of said bed section, and connecting links pivotally connecting said bracket to the abutments at the lower level on one side of said slots whereby the connection of said connecting links to such latter abutments will be fixed to enable said links to serve as a movable fulcrum with said bracket as a lever and said bed section as the weight when initially rocking said bracket to raise said pivot pins to the upper ends of said slots and then rocking said bed section rearwardly finally to enable said bed section to rest on said latter abutments and said supporting bracket, and whereby to enable said bed section during its actuation out of horizontal position to lower said pivot pins and deposit said bed section between said abutments.

2. The combination of a main bed section having vertically extending slots at the ends of one of its longitudinal sides, an enterchangeable back and bed forming section having pivot pins at the ends of one of its longitudinal sides slidably mounted in said slots, a supporting bracket having arms at the ends thereof and pivotally connected at the ends of said arms to the ends of said interchangeable section removed from said pivot pins, supporting abutments on said main bed section adjacent said slots and removed a scant bed height distance from the supporting floor to support one side of said interchangeable section at bed height level from the supporting floor in horizontal or bed forming position, and links pivotally connecting the arms of said supporting bracket to said supporting abutments.

3. The combination of a main bed section having vertically extending slots at the ends of one longitudinal side thereof with abutments on the opposite sides of the upper ends of said slots, an interchangeable back and bed forming section having pivot pins at the ends of one longitudinal side thereof slidably mounted in said slots and resting at one side of the abutments along the outer side of said slots in horizontal position, a supporting bracket having leg portions pivotally connected at its extremities to the ends of said interchangeable section removed from said pivot pins, and links pivotally connecting the leg portions of said bracket to the aforesaid abutments on the outer side of said slots with the pivotal connection thereof being fixed to enable said links to serve as a movable fulcrum with said bracket as a lever and said interchangeable bed section as the weight to raise said pivot pins to the upper ends of said slots when actuating said interchangeable section into bed forming position and thereupon enabling said interchangeable section to rest on said outer abutments and in turn to enable said links to serve as a movable fulcrum when said interchangeable section is rocked upwardly into erect position finally to enable said pivot pins to be lowered and thereupon enable said interchangeable bed section to drop by its own weight between said opposing abutments.

4. The combination of brackets having vertically extending slots and one pair of abutments along the outer side of the upper ends of said slots at a scant bed height distance removed from the supporting floor and spaced slightly outwardly from said slots, a bed section having pivot pins at the ends of one longitudinal side thereof slidably mounted in said slots and resting on said abutments in horizontal position, a U-shaped supporting bracket pivotally connected at its extremities to the ends of said bed section removed from said pivot pins, and links pivotally connected at one of their ends to the leg portions of the U-shaped bracket and pivotally connected at the other of their ends to said abutments.

5. The combination of a main bed section, brackets having vertical slots therein along the ends of one longitudinal side of said main bed section, a second bed section having pivot pins at the ends of one longitudinal side thereof slidably mounted in said slots, fixed abutments on said brackets adjacent the outer sides of the upper ends of said slots and removed a scant bed height distance from the supporting floor, supporting means pivotally connected to the ends of said second bed section removed from said pivot pins, and links pivotally connecting said supporting means with said abutments, said second bed section in horizontal position resting at one longitudinal side on said fixed abutments and at the other longitudinal side on said supporting means.

6. The combination of a main bed section, supporting brackets having vertical slots therein removably secured to the ends of one longitudinal side of said main bed section, a second bed section having pivot pins at the ends of one longitudinal side slidably mounted in said slots, abutments along the outer sides of the upper ends of said slots on said supporting brackets at a scant bed height distance removed from the supporting floor, a U-shaped supporting bracket pivotally connected at its extremities to the ends of said second bed section removed from said pivot pins, and links pivotally connected at one of their ends to the leg portions of said U-shaped bracket and pivotally connected at their other ends to the abutments along the outer sides of said slots, said bed section being positioned in horizontal position to rest at one longitudinal side on said fixed abutments and at the other longitudinal side on said supporting bracket.

7. The combination of a bed section, a frame having vertically extending slots, abutments on opposite sides of the upper ends of said slots, the abutments on the outer side of said slots being at a lower level than the abutments on the opposite side and forming a support for the adjacent end of said bed section in horizontal position, pivot pins on one end of said bed section slidably mounted in said slots with the bed section extending upwardly between said opposing abutments in erect position and maintained in erect position by said opposing abutments when the pins are near the lower ends of said slots, a supporting bracket pivotally connected at its extremities to other portions of said bed section, and connecting links pivotally connecting said bracket to the abutments at the lower level on one side of said slots whereby the connection of said connecting links to such latter abutments will be fixed to enable said links to serve as a movable fulcrum with said bracket as a lever and said bed section as the weight when initially rocking said bracket to raise said pivot pins to the upper ends of said slots and then rocking said bed section rearwardly finally to enable said bed section to rest on said latter abutments and said supporting bracket.

8. The combination of a bed section, a frame having vertically extending slots, abutments on opposite sides of the upper ends of said slots, the abutments on the outer side of said slots being at a lower level than the abutments on the opposite side and forming a support for the adjacent end of said bed section in horizontal position, pivot pins on one end of said bed section slidably mounted in said slots with the bed section extending upwardly between said opposing abutments in erect position and maintained in erect position by said opposing abutments when the pins are near the lower ends of said slots, a supporting bracket pivotally connected at its extremities to other portions of said bed section, and connecting links pivotally connecting said bracket to the abutments at the lower level on one side of said slots whereby the connection of said connecting links to such latter abutments will be fixed to enable said links to serve as a movable fulcrum when said interchangeable section is rocked upwardly into erect position and to lower said pivot pins and deposit said bed section between said abutments.

9. The combination of a main bed section having upwardly extending slots at the ends of one longitudinal side thereof with abutments on the opposite sides of the upper ends of said slots, an interchangeable back and bed forming section having pivot pins at the ends of one longitudinal side thereof slidably mounted in said slots and resting at one side on the abutments along the outer side of said slots in horizontal position, the abutments on the outer side of said slots being disposed at a scant bed height distance removed from the supporting floor and spaced slightly outwardly from said slots to permit said interchangeable bed section in erect position to incline slightly rearwardly out of the vertical, a supporting bracket having leg portions pivotally connected at its extremities to the ends of said interchangeable section removed from said pivot pins, and links pivotally connecting the leg portions of said brackets to the aforesaid abutments on the outer side of said slots with the pivotal connection thereof being fixed to enable said links to serve as a movable fulcrum with said bracket as a lever and said interchangeable bed section as the weight to raise said pivot pins to the upper ends of said slots when actuating said interchangeable section into bed forming position and thereupon enabling said interchangeable section to rest on said outer abutments.

10. The combination of a main bed section having upwardly extending slots at the ends of one longitudinal side thereof with abutments on the opposite sides of the upper ends of said slots, an interchangeable back and bed forming section having pivot pins at the ends of one longitudinal side thereof slidably mounted in said slots and resting at one side on the abutments along the outer side of said slots in horizontal position, the abutments on the outer side of said slots being disposed at a scant bed height distance removed from the supporting floor and spaced slightly outwardly from said slots to permit said interchangeable bed section in erect position to incline slightly rearwardly out of the vertical, a supporting bracket having leg portions pivotally connected at its extremities to the ends of said interchangeable section removed from said pivot pins, and links pivotally connecting the leg portions of said bracket to the aforesaid abutments on the outer side of said slots with the pivotal connection thereof being fixed to enable said links to serve as a movable fulcrum when said interchangeable section is rocked upwardly into erect position to enable said pivot pins to be lowered and thereupon to enable said interchangeable bed section to drop by its own weight between said opposing abutments.

11. The combination of brackets having vertically extending slots and one pair of abutments along the outer side of the upper ends of said slots at a scant bed height distance removed from the supporting floor and spaced slightly outwardly from said slots, a bed section having pivot pins at the ends of one longitudinal side thereof slidably mounted in said slots and resting on said abutments in horizontal position, a supporting bracket having arms pivotally connected at its extremities to the ends of said bed section removed from said pivot pins, and links pivotally connected at one of their ends to the arms of the supporting bracket and pivotally connected at the other of their ends to said abutments.

12. The combination of a frame adapted to be supported on a floor and having downwardly extending slots therein, a bed section having pivot pins at the ends of one longitudinal side thereof slidably mounted in said slots, fixed abutments on said frame adjacent the outer sides of the upper ends of said slots and removed a scant bed height distance from the supporting floor, supporting means pivotally connected to the ends of said bed section removed from said pivot pins, and links pivotally connecting said supporting means with said abutments, said bed section in horizontal position depending for support by having a portion thereof resting on said fixed abutments and another portion thereof resting on said supporting means.

13. The combination of a bed section, a frame having an upwardly extending slot, abutments on opposite sides of the upper end of said slot, one of said abutments forming a support for the adjacent end of said bed section in horizontal position, a pivot pin on one end of said bed section slidably mounted in said slot with the bed section extending upwardly between said abutments in erect position and maintained in erect position by said opposing abutments, a support pivotally connected to said bed section, and a connecting link pivotally connecting said support to one of said abutments whereby the connection of said connecting link to such abutment will serve as a fulcrum to enable said bed section when said support is actuated out of erect position initially to raise said pivot pin and while moving toward the upper end of said slot enable said bed section to swing over and rest on such abutment and said support and whereby to enable said bed section when actuated out of horizontal position to lower said pivot pin and deposit said bed section between said abutments.

14. The combination of a seat section having upwardly extending slots along the rear sides thereof having supports at the upper ends of said slots, an interchangeable back and bed forming section having pivot pins slidably mounted in said slots and resting along one side on said supports in horizontal position, leg forming members pivotally connected to said interchangeable section at a point removed from said seat section, and links pivotally connecting said leg forming members to said supports, each link pivotally connected at one end to a leg forming member at a point removed from the pivotal connection of said leg forming member with said section, and each link pivotally connected at its other end to one of said supports.

15. The combination of a seat section having vertically extending slots along the rear sides thereof with abutments on the opposite sides of the upper ends of said slots, an interchangeable back and bed forming section having pivot pins slidably mounted in said slots and resting on one of said abutments in horizontal position, leg forming members pivotally connected to said interchangeable section at a point removed from said seat section, and links pivotally connecting said leg forming members to one of said abutments with the pivotal connection thereof serving as a fulcrum when an outward force is applied to said links to raise said pivot pins to the upper ends of said slots when actuating said interchangeable section into bed forming position and after having been actuated into bed forming position thereupon enabling said interchangeable section to rest on one of said abutments and in turn when actuating said interchangeable section into back forming position said links in turn serving as a fulcrum to lower said pivot pins and thereupon position said interchangeable section between said abutments.

16. The combination of a frame, a bed section, a slot and pin connection connecting said bed section to said frame, abutments on opposite sides of said slot and pin connection, one of said abutments forming a support for the adjacent end of said bed section in horizontal position, the bed section extending upwardly between said abutments in erect position and maintained in erect position by said opposing abutments, a support pivotally connected to said bed section removed from said slot and pin connection, and a connecting link pivotally connecting said support to one of said abutments.

JOSEPH MARTIN.